United States Patent [19]

Garrett, Sr.

[11] Patent Number: 4,458,439

[45] Date of Patent: Jul. 10, 1984

[54] FISHING FLOAT DEVICE

[76] Inventor: Donald L. Garrett, Sr., 6511 Cooper Chapel Rd., Louisville, Ky. 40219

[21] Appl. No.: 398,761

[22] Filed: Jul. 15, 1982

[51] Int. Cl.³ .................................................. A01K 93/00
[52] U.S. Cl. ........................................ 43/17.6; 43/44.87; 43/44.9; 43/44.91; 43/44.92
[58] Field of Search .................. 43/43.1, 43.15, 44.91, 43/44.9, 44.93, 44.92, 44.87, 44.89, 17.1, 17.5, 17.6

[56] References Cited

U.S. PATENT DOCUMENTS 2,829,464  4/1958  Pettit, Jr. et al. ................. 43/44.91
3,056,229  10/1962  Haney ............................. 43/44.87

Primary Examiner—Willie G. Abercrombie
Assistant Examiner—Kurt Rowan
Attorney, Agent, or Firm—Edward M. Steutermann

[57] ABSTRACT

A fishing float arrangement including first and second body members with a slot extending to a central aperture to retain a fishing line. A cam member with electrical contacts is disposed between the body members to allow switching a battery powered light within the body portion.

1 Claim, 4 Drawing Figures

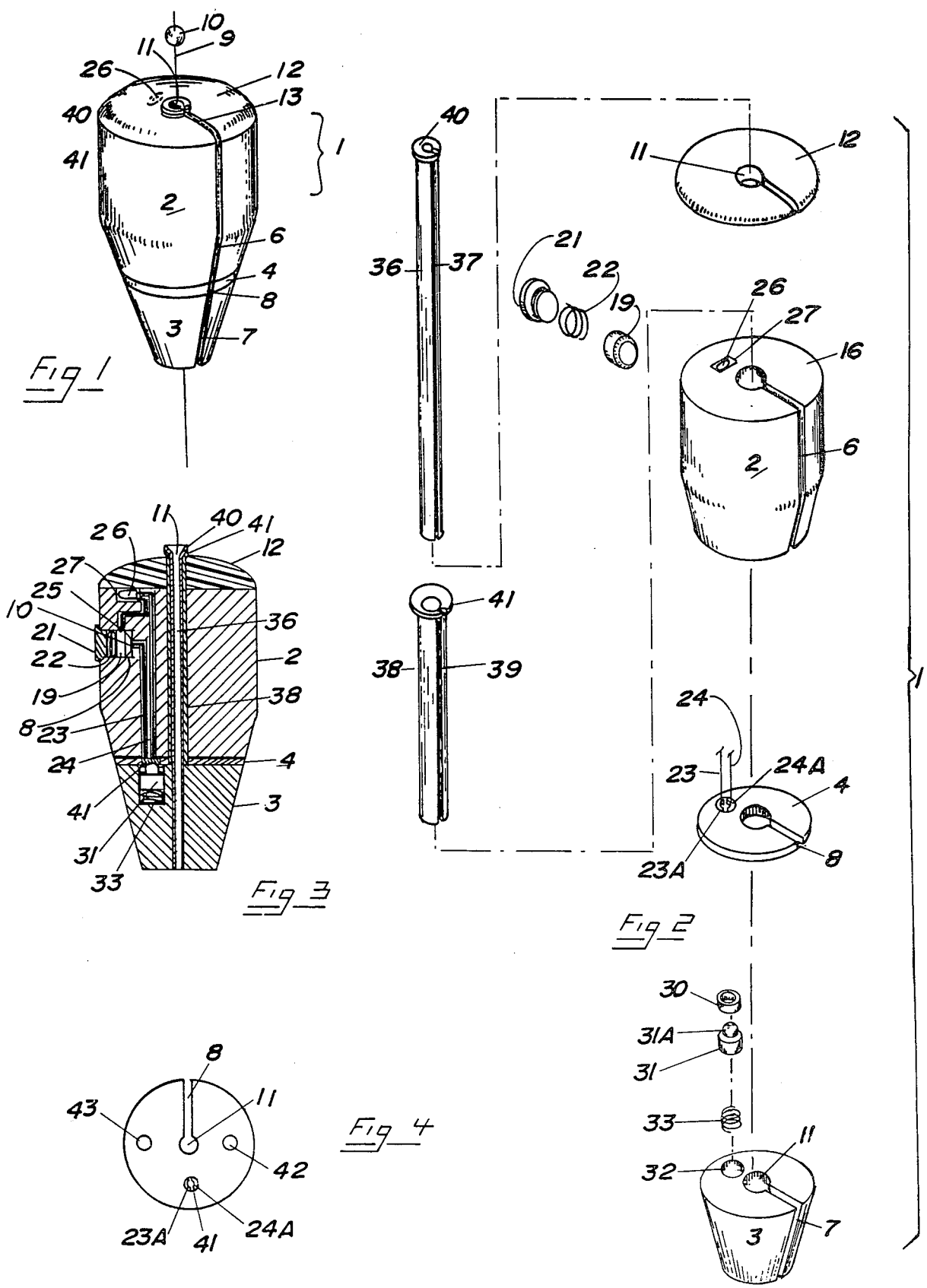

FISHING FLOAT DEVICE

BACKGROUND OF THE INVENTION

The present invention relates to fishing equipment and more particularly to a fishing float for use with a fishing line.

Fishing floats are well known and in common usage and there are numerous float devices presently available. In general such floats are not readily visable in choppy water or not visable at night to determine the position of the fishing line.

Further, where illuminated fishing floats are known, such devices have been complicated in operation, particularly in the manipulation required for insertion of a line through the float device or secure attachment of the float device to the line so that movement of the float relative to the float device is accomplished only with considerable difficulty.

Various prior art illuminated fishing floats are known and an example of one such arrangement is shown in U.S. Pat. No. 2,654,972—Hollingsworth where a device is taught which is particularly adapted to indicating the presence of fish on the line by a pull on the fishing line which activates a light. Another arrangement is shown in U.S. Pat. No. 2,527,956—Peevey where a device is shown to be used as a fishing line position indicator but where the line is fed through the device so that the hook or other bait device must be removed from the line prior to insertion of the line or of the device on the line.

Another device where the line is located through the device as shown in U.S. Pat. No. 2,571,808—Aldinger, and another illuminated fishing float is shown in U.S. Pat. No. 2,485,087—Diamond where the fishing line is attached directly to the float which carries a light emitting device to indicate the position of the float but where the light cannot be turned on and off.

No prior art device is known for an illuminated fishing float where the line is easily removed from the device and where the float can be utilized without use of the light to preserve battery power during, for example, daylight fishing.

Further, no device is known where the line can be easily inserted into the float and utilized and the float removed from the line without removal of the hook or other devices from the line.

SUMMARY OF THE INVENTION

The present invention provides a new and useful fishing float arrangement which is inexpensive and provides a simple and effective way of fishing day or night. In devices in accordance with the present invention the fisherman can secure the float to the line at any desired depth, for example, with the use of a bead on the line and remove the float from the line easily without cutting the line or removing any other devices on the line. Additionally the present invention can be adapted to provide weights so that no sinkers or other devices are necessary to allow casting. In connection with the adaptation of the device as an illuminated fishing float a cam member is provided to selectively actuate or deactuate an associated lamp and to likewise position the elements of the device for easy removal and attachment of the device to a fishing line.

More particularly, the present invention provides a fishing float arrangement including a first body member having a first central aperture extending longitudinally therethrough, with a first slot extending from the first aperture to the outer surface of the first body member along the length thereof, a second body member having a second central aperture extending longitudinally therethrough in aligned relation with the first aperture of the first body member and a second slot extending along the length of the second aperture to the outer surface of the second body member, a cam member having a cam aperture in aligned relation with the first and second apertures disposed between the first body member and the second body member and including at least two indent sections on the side adjacent the second body member, one of said indent means including electrical contact device, spring loaded detent device carried by the second body member to be urged into contact with the indents of the cam member where a cam slot extends from the cam aperture to the outer surface of the cam and including electrically conductive contact means to selectively contact the conductive contact of the cam member, a source of electrical power carried within the first body member and including leads to the conductive contact and a light emitting device to receive electrical energy when the conductive contact of the cam member is in contact with the contact device of the detent, first sleeve means to extend from the outermost edge of the first body member through the first aperture and into the second aperture where the first sleeve member is connected to the second body member and fastener means to allow rotation of the first sleeve member within the first aperture and a fastener device to rotatably retain the first sleeve in the first body member, where the first sleeve means has a first sleeve slot extending along the length of the first sleeve member in aligned relation with the first slot and second sleeve member connected to the cam member to extend into the first aperture in surrounding relation with the first sleeve member where the second sleeve member includes a second sleeve slot in aligned relation with the second slot and extending the length of the second sleeve to be selectively rotated to aligned position with the slot of the first sleeve member to allow insertion of a string into the center of the first sleeve to retain the float assembly on the string.

Various arrangements within the scope of the present invention will occur to those skilled in the art upon reading the disclosure set forth hereinafter.

BRIEF DESCRIPTION OF THE DRAWINGS

One arrangement within the scope of the present invention is illustrated in the accompanying drawings wherein:

FIG. 1 is a perspective view of an assembled illuminated float within the scope of the present invention;

FIG. 2 is an exploded view of the device shown in FIG. 1 illustrating the elements thereof; and FIG. 3 is a sectional elevational view of the device of FIG. 2 in assembled form.

FIG. 4 is a view taken along a plane passing through line 4—4 of FIG. 2.

DETAILED DESCRIPTION OF THE DRAWINGS

Referring to FIG. 1 a float 1 is shown including an upper body portion 2 and a lower body portion 3. In the arrangement shown a portion of body portion 2 is cylindrical and then transforms to a frusto conical section while body member 3 is frustro conical in shape. It will be understood that the configuration shown is but one example of a design useful within the scope of the present invention and the scope of the present invention is not limited thereby. A cam member 4 is disposed between body members 2 and 3 as will be described hereinafter and attached to body member 2. Body member 2 is provided with a slot 6 which extends the length of the body member and body member 3 is likewise provided with a slot 7. A slot 8 is provided in cam member 4 so that, as described in more detail hereinafter, slots 6, 7 and 8 can be aligned for insertion of a string 9 into a central aperture 11 of body member 2 and 3 as well as cam member 4. Body member 3 is then rotated relative to body 2 to retain the string. A dome member 12, for example, a transparent plastic dome, can be provided and have a slot 13 to likewise receive line 9. In the arrangement shown a bead 10 is provided on line 9 to engage the top of dome 12 to retain float 1.

FIG. 3 is a detailed exploded view of the arrangement of FIG. 1. Dome member 12 is shown apart from body 2 but it will be understood that dome 12 can be securely fastened to body 12 with slot 13 in aligned relation with slot 12. Dome member 12 is received on an upper surface 16 of body member 2. In the arrangement shown in FIG. 3 a pocket 18 is provided in body member 2 and adapted to receive a battery 19 where a threaded cap 21 is provided to be received in co-operative threads (not shown) in pocket 18. A spring 22 is provided between cap 21 and battery 19 to urge battery 19 into electrically conductive contact with contacts 20 and 25 connected to leads 23 and 24 as shown. Leads 23 and 24 are connected through a lamp 26, for example, a light emitting diode, received in a pocket 27 of body member 2. Dome 12 can be transparent to allow emission of light from lamp 26. It will be understood that normally dome 12 is on the upper side of the float so that it is exposed and the light from lamp 26 is visible from a distance.

A detent member, for example a plunger 31 is provided to be received in a pocket 32 of body member 3. Plunger 31 is provided with an electrically conductive contact 31A which extends unexpectedly from the surface of body 3 to act as a detent. A spring 33 is provided to be disposed between plunger 31 and the bottom of pocket 32 so that contact 31A is urged upwardly to engage indents as described hereinafter in cam member 4. A retainer ring 30 can be provided to engage the periphery of plunger 31 to retain the plunger in pocket 32. Advantageously, contact 31A is electrically conductive and engage terminal ends 24A, 23A of leads 23 and 24 (FIG. 4) which can, for example be split rings located in cam 4 so that current can flow, for example, from battery 19 to contacts 23A, 24A and contact 31 to close a circuit to illuminate lamp 26 when cam 4 is in selected position.

As shown, an aperture 11 extends through body 3 so that fishing line 9 extends through dome 12, body 2, and body 3. In accordance with one feature of the present invention an inside sleeve 36 is provided having an elongate slot 37 extending the length thereof. Sleeve 36 is connected to body member 3 with slot 37 of sleeve 36 in generally aligned relation with slot 7 of body member 3. A second sleeve 38 is provided and carried by cam 4 to extend upwardly therefrom into aperture 11 of body member 2 and to receive sleeve 36 carried by body member 3. As shown in FIG. 3, sleeve 38 likewise has a slot 39.

The entire assembly can be secured by convenient fastener means, for example, by a flare 40 at the top of sleeve 36 which engages the upper side of dome 12 so that, because sleeve 36 is secured to cam 4 the entire assembly is secured together and sleeve 36 is rotatable in sleeve 38 by rotation of body 3.

The device is shown in assembled form in FIG. 2 where the orientation of battery 19, leads 23, 24, contacts 24A, 23A, bolt 31 and sleeves 36, 38 are shown.

FIG. 4 is an illustration of the bottom side of cam 4 illustrating the relative position of slot 8, indetent 41 which includes contacts 23A, 24A and additional indetents 42 and 43.

In operation contact 31 is received in indents 41, 42, 43 as body member 3 is rotated to prevent unwanted rotation of sleeve 36. When contact 31 is in contact with indent 41 a sleeve 36 and 38 are positioned so that slots 37 and 39 are out of aligned relation and line 9 is retained within the device. Then, for example, when ball 31 is in contact with indent 41 the slots 37 and 39 of sleeves 36 and 38 are in aligned relation as are the slots 13, 6 and 7 of dome 12, body member 2 and body member 3 so that line 9 can be removed from the device.

When body member 3 is rotated so that ball 31 contacts indent 42, the circuit to lamp 26 is open so that the lamp is off and slots 37 and 40 of sleeves 36 and 39 are out of aligned relation as are the slots 13, 6 and 7 of dome 12, and body member 3 so that the lamp is out but the line 9 is retained within the device, for example, for daytime fishing.

Various other advantages and features of the present invention as well as other arrangements also within the scope of the present invention will occur to those skilled in the art upon reading of the disclosure set forth hereinafter.

The invention claimed is:

1. A fishing float arrangement including a first body member having a first central aperture extending longitudinally therethrough, with a first slot extending from the first aperture to the outer surface of the first body member along the length thereof, a second body member having a second central aperture extending longitudinally therethrough in aligned relation with the first aperture of the first body member and a second slot extending along the length of the second aperture to the outer surface of the second body member, a cam member having a cam aperture in aligned relation with the first and second apertures disposed between the first body member and the second body member to be carried by said second body member and including at least two indent sections on the side adjacent the second body member detent device carried by the second body member to be urged into contact with the indents of the cam member where a cam slot extends from the cam aperture to the outer surface of the cam, first sleeve means to extend from the outermost edge of the first body member through the first aperture and into the second aperture where the first sleeve member is connected to the second body member and fastener means to allow rotation of the first sleeve member within the first aperture and a fastener device to rotatably retain the first sleeve in the first body member, where the first sleeve means has a first sleeve slot extending along the length of the first sleeve member and second sleeve member connected to the cam member to extend into the first aperture in surrounding relation with the first sleeve member where the second sleeve member includes a second sleeve slot extending along the length thereof and disposed in aligned relation with the first slot and the second sleeve to be selectively rotated to aligned position with the first slot to allow insertion of a string into the center of the first sleeve to retain the float assembly on the string and where the second body member can be rotated to move the second sleeve out of aligned relation with the first sleeve slot.

* * * * *